US012603052B2

(12) United States Patent
Shin et al.

(10) Patent No.: US 12,603,052 B2
(45) Date of Patent: Apr. 14, 2026

(54) PIXEL CIRCUIT AND ELECTROLUMINESCENT DISPLAY APPARATUS INCLUDING THE SAME

(71) Applicant: LG Display Co., Ltd., Seoul (KR)

(72) Inventors: Yong Hyeon Shin, Paju-si (KR); Jai Youn Song, Paju-si (KR); Jin U Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/982,886

(22) Filed: Dec. 16, 2024

(65) Prior Publication Data

US 2025/0273146 A1 Aug. 28, 2025

(30) Foreign Application Priority Data

Feb. 22, 2024 (KR) ........................ 10-2024-0025778

(51) Int. Cl.
*G09G 3/3233* (2016.01)

(52) U.S. Cl.
CPC ... *G09G 3/3233* (2013.01); *G09G 2300/0852* (2013.01); *G09G 2300/0861* (2013.01); *G09G 2310/08* (2013.01); *G09G 2320/0233* (2013.01)

(58) Field of Classification Search
CPC ......... G09G 3/3233; G09G 2300/0852; G09G 2300/0861; G09G 2310/08; G09G 2320/0233
See application file for complete search history.

(56) References Cited

U.S. PATENT DOCUMENTS

2021/0390905 A1* 12/2021 Kim ................... H10K 59/1213
2022/0384548 A1* 12/2022 Keum .................. H10K 59/123

FOREIGN PATENT DOCUMENTS

KR 10-2023-0103648 A 7/2023

* cited by examiner

*Primary Examiner* — Kenneth B Lee, Jr.
(74) *Attorney, Agent, or Firm* — Birch, Stewart, Kolasch & Birch, LLP

(57) ABSTRACT

A pixel circuit and an electroluminescent display apparatus are discussed. The pixel circuit can include a driving transistor having a gate electrode connected to a gate node and a source electrode connected to a source node, and configured to generate a driving current. The pixel circuit can further include a first light emitting device having a first anode electrode, a second light emitting device having a second anode electrode, a first emission transistor connecting the source node to the first anode electrode in an odd frame and disconnecting the source node from the first anode electrode during an even frame in response to a first emission signal, and a second emission transistor connecting the source node to the second anode electrode in the even frame and disconnecting the source node from the second anode electrode during the odd frame in response to a second emission signal.

7 Claims, 17 Drawing Sheets

PIXEL CIRCUIT AND ELECTROLUMINESCENT DISPLAY APPARATUS INCLUDING THE SAME

CROSS-REFERENCE TO RELATED APPLICATIONS

This application claims priority to Korean Patent Application No. 10-2024-0025778, filed in the Republic of Korea on Feb. 22, 2024, the entirety of which is hereby expressly incorporated by reference into the present application.

BACKGROUND

Field of the Invention

The present disclosure relates to a pixel circuit and an electroluminescent display apparatus including the same.

Discussion of the Related Art

Electroluminescent display apparatuses include pixels arranged as a matrix type and supply image data to the pixels in synchronization with a scan signal, and thus, implement luminance corresponding to the image data in the pixels.

Each of the pixels includes a driving element which generates a driving current corresponding to image data and a light emitting device which emits light with brightness corresponding to the driving current. A level of the driving current is proportional to a gray level of the image data, and as the driving current increases, the amount of emission of the light emitting device contributing luminance increases.

However, in a case where a gray level of image data applied to a pixel is changed from black to white and then maintains a white gray level during several frames, a luminance deviation can occur between a first frame immediately after being changed to a white gray level and the other frames maintaining a white gray level. A gray level of the image data is maintained to be white in the other frames, and in the first frame, a gray level of the image data is changed from black to white. Due to this configuration, a charge delay of a light emitting device of a corresponding pixel can occur in the first frame, which can cause the luminance to be lower than a target luminance.

SUMMARY OF THE DISCLOSURE

To overcome the aforementioned problems and other limitations of the related art, the present disclosure can provide a pixel circuit and an electroluminescent display apparatus including the same, which can decrease a luminance deviation appearing in a pixel at the moment a gray level of image data is changed from black to white.

To achieve these objects and other advantages and in accordance with the purpose of the disclosure, as embodied and broadly described herein, a pixel circuit include a driving transistor configured to include a gate electrode connected to a gate node and a source electrode connected to a source node, and generate a driving current; a first light emitting device configured to include a first anode electrode and emit light in response to the driving current; a second light emitting device configured to include a second anode electrode and emit light in response to the driving current; a first emission transistor connecting the source node to the first anode electrode in an odd frame and disconnecting the source node from the first anode electrode during an even frame, in response to a first emission signal; and a second emission transistor connecting the source node to the second anode electrode in the even frame and disconnecting the source node from the second anode electrode during the odd frame, in response to a second emission signal.

According to aspects of the present disclosure, an electroluminescent display apparatus can include a display panel including a plurality of pixels; a gate driver configured to drive scan lines and emission lines connected to the plurality of pixels; and a data driver configured to drive data lines connected to the plurality of pixels, wherein a pixel circuit of each of the plurality of pixels comprises: a driving transistor including a gate electrode connected to a gate node and a source electrode connected to a source node, and configured to generate a driving current; a first light emitting device including a first anode electrode, and configured to emit light in response to the driving current; a second light emitting device including a second anode electrode, and configured to emit light in response to the driving current; a first emission transistor configured to connect the source node to the first anode electrode in an odd frame and disconnect the source node from the first anode electrode during an even frame, in response to a first emission signal supplied through a first emission line; and a second emission transistor configured to connect the source node to the second anode electrode in the even frame and disconnect the source node from the second anode electrode during the odd frame, in response to a second emission signal supplied through a second emission line.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE EMBODIMENTS

Figure 1:
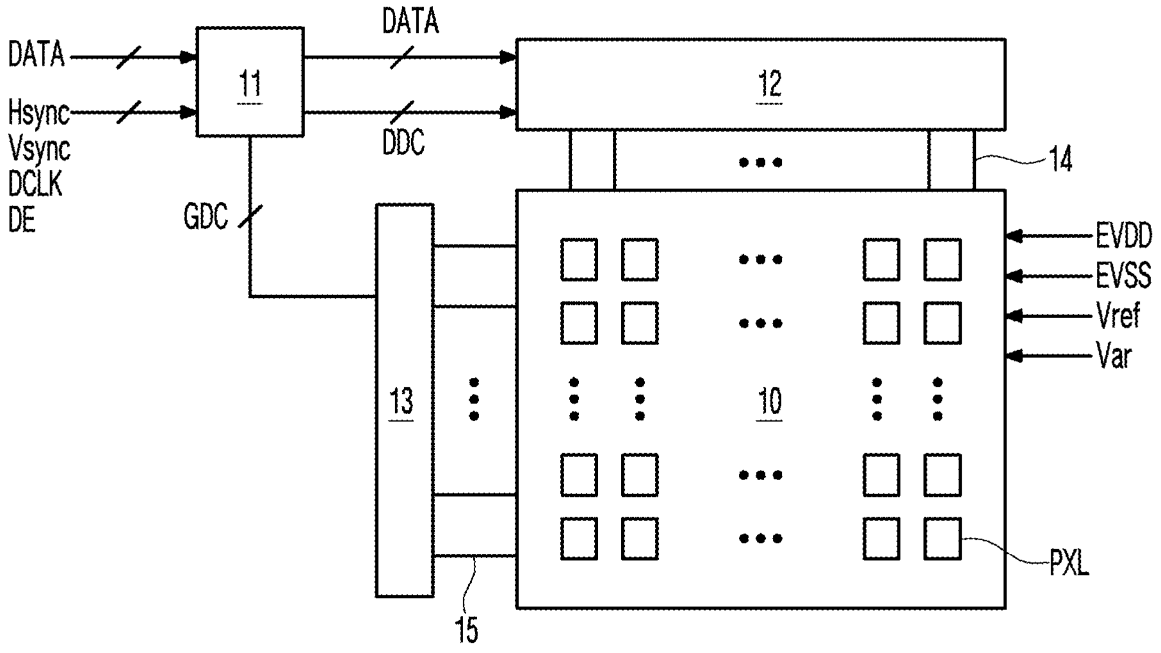
FIG. 1 is a diagram illustrating an electroluminescent display apparatus according to one or more embodiments of the present disclosure.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art.

The shapes, sizes, ratios, angles, numbers and the like disclosed in the drawings for description of various embodiments of the present disclosure to describe embodiments of the present disclosure are merely exemplary and the present disclosure is not limited thereto. Like reference numerals refer to like elements throughout. Throughout this specification, the same elements are denoted by the same reference numerals. As used herein, the terms "comprise", "having," "including" and the like suggest that other parts can be added unless the term "only" is used. As used herein, the singular forms "a", "an", and "the" are intended to include the plural forms as well, unless context clearly indicates otherwise.

Elements in various embodiments of the present disclosure are to be interpreted as including margins of error even without explicit statements. Further, the term "can" fully encompasses all the meanings and coverages of the term "may."

In describing a position relationship, for example, when a position relation between two parts is described as "on", "over", "under", and "next", one or more other parts can be disposed between the two parts unless "just" or "direct" is used.

It will be understood that, although the terms "first", "second", etc. can be used herein to describe various elements, these elements should not be limited by these terms. These terms are only used to distinguish one element from another. For example, a first element could be termed a second element, and, similarly, a second element could be termed a first element, without departing from the scope of the present disclosure.

Hereinafter, embodiments of the present disclosure will be described in detail with reference to the accompanying drawings. In the following embodiments, as an example of an electroluminescent display apparatus, an organic light emitting display apparatus including an organic light emitting material will be mainly described. However, the inventive concept is not limited to the organic light emitting display apparatus and can be applied to an inorganic light emitting display apparatus including an inorganic light emitting material. All the components of each element/device/apparatus according to all embodiments of the present disclosure are operatively coupled and configured.

FIG. 1 is a diagram illustrating an electroluminescent display apparatus according to one or more embodiments of the present disclosure.

Referring to FIG. 1, the electroluminescent display apparatus can include a display panel 10, a timing controller 11, a data driver 12, a gate driver 13, and a power circuit.

A plurality of pixels PXL included in the display panel 10 can be arranged in a matrix type to configure a pixel array. In the pixel array, each of the plurality of pixels PXL can be connected to a data line 14, a gate line 15, a reset voltage power line, a reference voltage power line, a high-level power line, and a low-level power line. Here, the gate line 15 connected to one pixel PXL can include a plurality of scan lines and a plurality of emission lines. Each pixel PXL can be supplied with a data voltage through the data line 14, a plurality of scan signals having different phases through a plurality of scan lines, a plurality of emission signals having different phases through a plurality of emission lines, a reset voltage Var through the reset voltage power line, a reference voltage Vref through the reference voltage power line, a high-level pixel source voltage EVDD through the high-level power line, and a low-level pixel source voltage EVSS through the low-level power line.

The reset voltage power line, the reference voltage power line, the high-level power line, and the low-level power line can be connected to the power circuit. The power circuit can output the reset voltage Var, the reference voltage Vref, the high-level pixel source voltage EVDD, and the low-level pixel source voltage EVSS.

A pixel circuit included in each pixel PXL can include one driving transistor and two light emitting devices. The driving transistor can generate a driving current which is to be supplied to light emitting devices, based on image data DATA. The two light emitting devices can be alternately connected to the driving transistor at a period of a certain time, and thus, can alternately emit light at a period of the certain time. While one of the two light emitting devices is emitting light, the other light emitting device can not emit light. The driving transistor included in each pixel PXL can be implemented as an oxide transistor which is good in leakage current characteristic, but the present disclosure is not limited thereto.

The timing controller 11 can receive image data DATA and timing control information Vsync, Hsync, DCLK, and DE from a host system. The timing control information Vsync, Hsync, DCLK, and DE can include a vertical synchronization signal Vsync, a horizontal synchronization signal Hsync, a dot clock DCLK, and a data enable signal DE.

The timing controller 11 can generate a source control signal DDC for controlling an operation timing of the data driver 12 and a gate control signal GDC for controlling an operation timing of the gate driver 13, based on the timing control information Vsync, Hsync, DCLK, and DE.

The timing controller 11 can supply the data driver 12 with the source control signal DDC along with the image data DATA. The timing controller 11 can supply the gate driver 13 with the gate control signal GDC.

The data driver 12 can convert the image data DATA from a digital format into an analog format to generate a data voltage corresponding to the image data DATA, based on the source control signal DDC. The data voltage can be generated to have a level varying based on a gray level of the image data DATA within a predetermined voltage range. A lower limit voltage value of the voltage range can correspond to a data voltage representing a black gray level. An upper limit voltage value of the voltage range can correspond to a data voltage representing a white gray level.

The data driver 12 can output data voltage to data lines 14 of the display panel 10.

The gate driver 13 can generate the plurality of scan signals and the plurality of emission signals having different phases, based on the gate control signal GDC. The gate driver 13 can output the plurality of scan signals to the plurality of scan lines and can output the plurality of emission signals to the plurality of emission lines, and thus, can select a pixel row in which is to be written. Here, the pixel row can denote a set of pixels PXL adjacent to one another in a horizontal direction. Pixels PXL configuring one pixel row can be connected to the data driver 12 through a plurality of data lines and can be connected to the gate driver 13 through the plurality of scan lines and the plurality of emission lines.

The gate driver 13 can be directly formed in a bezel region of the display panel 10, based on a gate driver in panel (GIP) type. Here, the bezel region can correspond to a non-display area outside a screen region configured with the pixel array. The bezel region may not display an image.

Figure 2:
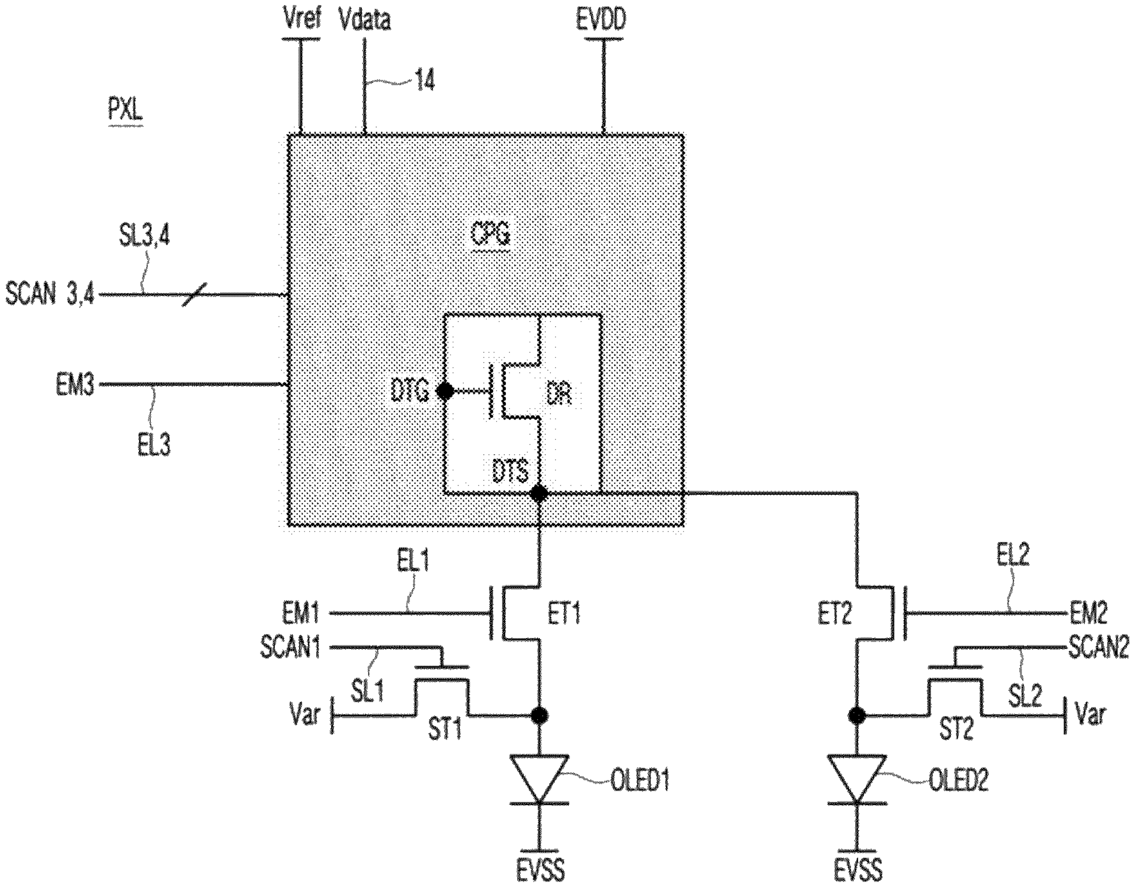
FIG. 2 is a diagram schematically illustrating a configuration of one pixel circuit provided in a display panel of FIG. 1.
Figure 3:
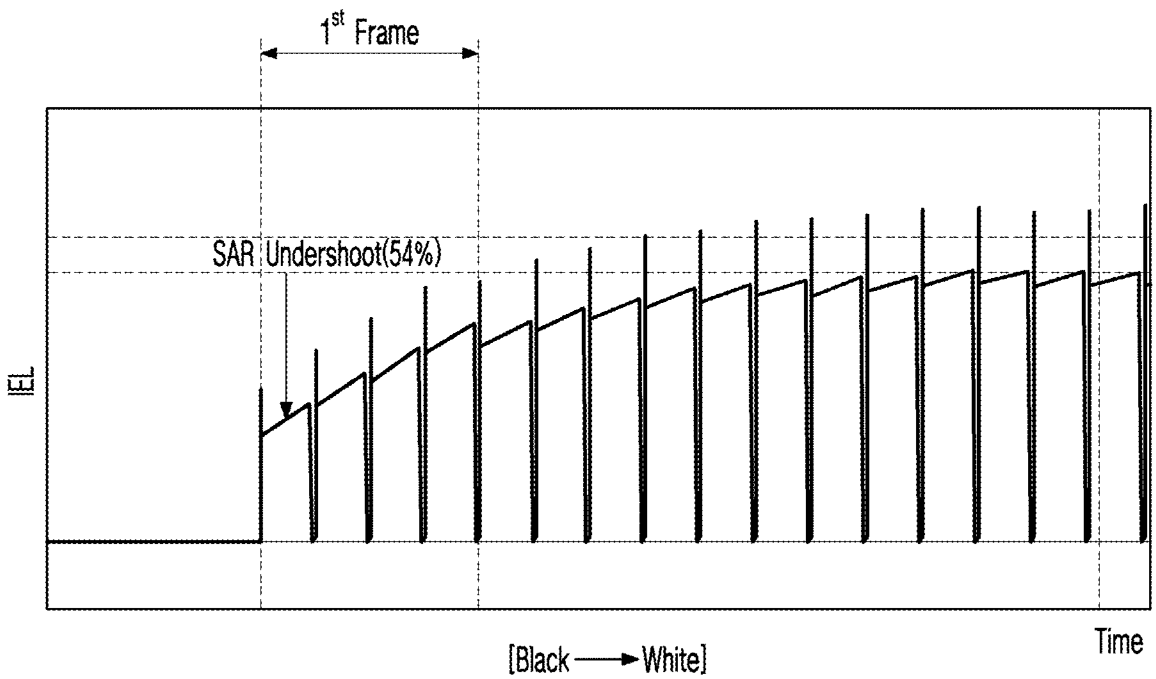
FIG. 3 is a diagram for describing a luminance deviation occurring at the moment a gray level of image data is changed from black to white.
Figure 4A:
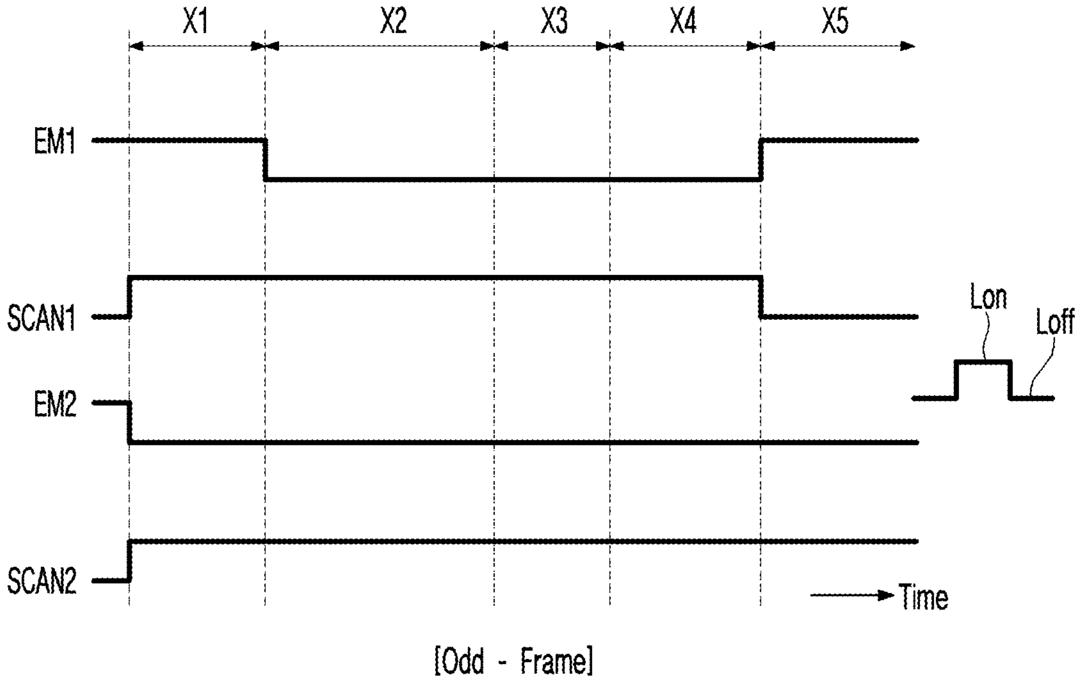
FIG. 4A is a schematic driving waveform diagram of a pixel circuit of FIG. 2 in an odd frame.
Figure 4B:
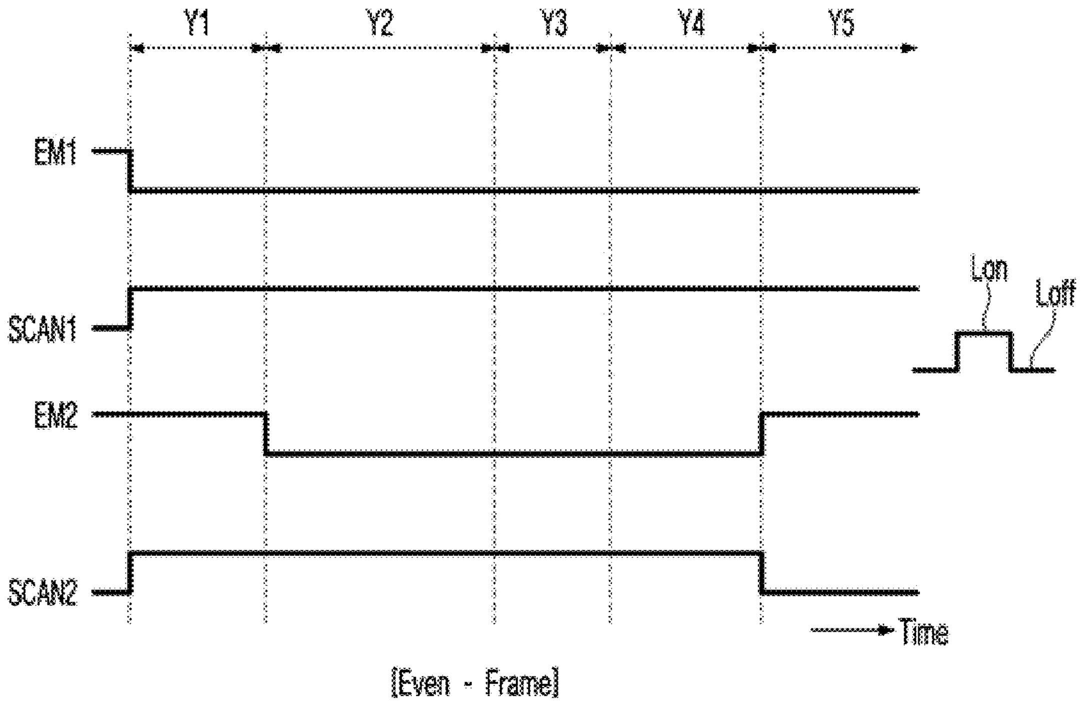
FIG. 4B is a schematic driving waveform diagram of the pixel circuit of FIG. 2 in an even frame.
Figure 5:
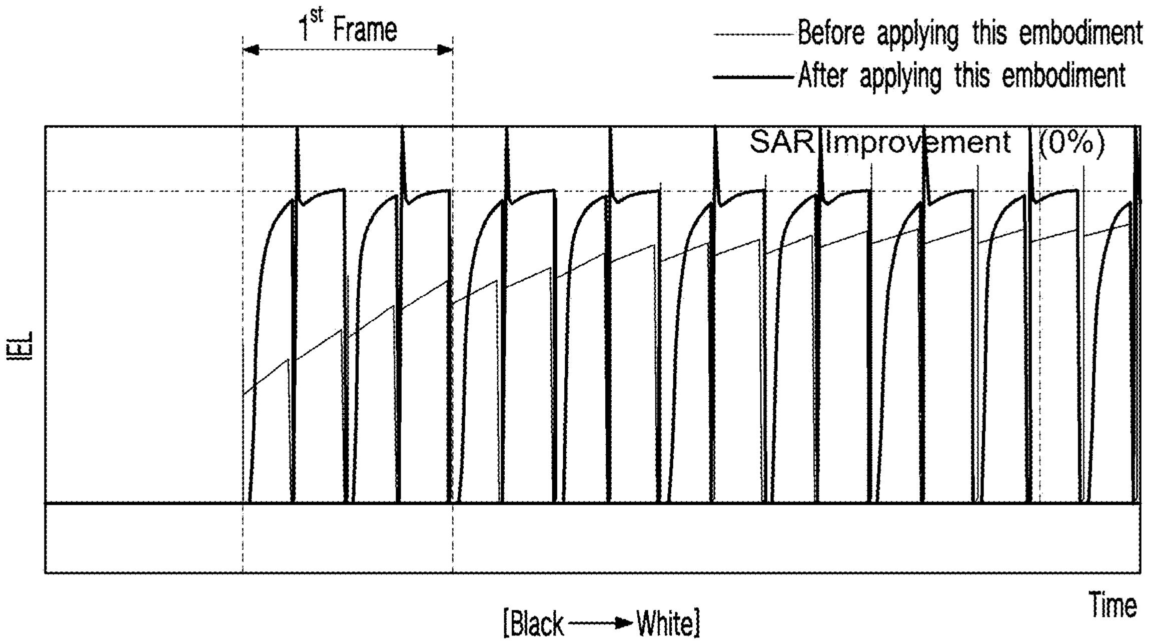
FIG. 5 is a diagram illustrating an example where a luminance deviation, occurring at the moment a gray level of image data is changed from black to white, is reduced by the application of the present disclosure.

FIG. 2 is a diagram schematically illustrating a configuration of one pixel circuit provided in a display panel of FIG. 1. FIG. 3 is a diagram for describing a luminance deviation occurring at the moment a gray level of image data is changed from black to white. FIG. 4A is a schematic driving waveform diagram of a pixel circuit of FIG. 2 in an odd frame. FIG. 4B is a schematic driving waveform diagram of the pixel circuit of FIG. 2 in an even frame. FIG. 5 is a diagram illustrating an example where a luminance deviation, occurring at the moment a gray level of image data is changed from black to white, is reduced by the application of the present disclosure.

Referring to FIG. 2, one pixel PXL arranged in one pixel row is illustrated.

A pixel PXL according to aspects of the present disclosure can be for decreasing a luminance deviation appearing in a first frame where a gray level of a data voltage Vdata is changed from black to white, as shown in FIG. 3.

The luminance deviation can occur because a luminance of a first frame (hereinafter referred to as an $n^{th}$ frame) immediately after being changed from a black gray level to a white gray level is lower than that of a next frame (hereinafter referred to as an $n^{th}$+1 frame) maintaining a white gray level. For example, the luminance deviation can occur because a level of a driving current IEL of the $n^{th}$ frame for implementing the same white gray level is lower than that of the driving current IEL of the $n^{th}$+1 frame.

The degree of charge delay of an internal capacitor of a light emitting device can be changed based on a gray level of a previous frame, and due to this, a deviation can occur in the driving current IEL and an anode voltage of the light emitting device. The data voltage representing a white gray level can be greater than the data voltage representing a black gray level. Therefore, as in an embodiment, when a gray level of an $n^{th}$-1 frame is black and a gray level of each of the $n^{th}$ frame and the $n^{th}$+1 frame is white, charge delay can be relatively large in the $n^{th}$ frame which is changed from a black gray level to a white gray level, and charge delay can be relatively small in the $n^{th}$+1 frame maintaining a white gray level.

Such a luminance deviation can be referred to as a shooting amount ratio (SAR). An SAR can be largest in the $n^{th}$ frame including a moment a gray level is changed from a black gray level to a white gray level, can progressively decrease in the $n^{th}$ frame including next frames maintaining a white gray level, and can be almost close to zero from a specific next frame. For example, an SAR of the $n^{th}$ frame can be 54% less than the specific next frame.

An SAR can be a concept that includes up to a recognition deviation of a black gray level as well as a recognition deviation of a white gray level. However, a recognition deviation of a black gray level can be ignored because a recognition deviation of a black gray level is far less than a recognition deviation of a white gray level.

In other words, an SAR can be easily recognized when a gray level of a previous frame is black and a gray level of a current frame is white. However, in a case which is opposite thereto, namely, when a gray level of a previous frame is white and a gray level of a current frame is black, an SAR can not be easily recognized. In the following description, therefore, only a recognition deviation of a white gray level will be described as an example of an SAR.

The pixel PXL of the present disclosure illustrated in FIG. 2 can be for decreasing an SAR and can have a feature where an anode voltage of a light emitting device is equally initialized in all frames regardless of a gray level of a previous frame.

Such a feature can be based on on-off alternating driving using two light emitting devices and discharge driving performed in a light emitting device which is off-driven. This will be described below in detail.

The pixel PXL according to aspects of the present disclosure can include a first light emitting device OLED1, a second light emitting device OLED2, a driving transistor DR, a first emission transistor ET1, and a second emission transistor ET2, for on-off alternating driving and discharge driving.

The driving transistor DR can generate a driving current which is to be supplied to the first light emitting device OLED1 or the second light emitting device OLED2. A gate electrode of the driving transistor DR can be connected to a gate node DTG, and a source electrode of the driving transistor DR can be connected to a source node DTS. The driving current can be proportional to the square of a voltage difference between the gate node DTG and the source node DTS.

The first light emitting device OLED1 can include a first anode electrode, a first cathode electrode, and a first emission layer disposed therebetween. A low-level pixel source voltage EVSS can be supplied to the first cathode electrode, and the first anode electrode can be coupled to the first cathode electrode through an internal capacitor and an internal resistor.

The second light emitting device OLED2 can include a second anode electrode, a second cathode electrode, and a second emission layer disposed therebetween. The low-level pixel source voltage EVSS can be supplied to the second cathode electrode, and the second anode electrode can be coupled to the second cathode electrode through an internal capacitor and an internal resistor. The second light emitting device OLED2 can emit light with a driving current supplied from the driving transistor DR.

The first light emitting device OLED1 can be on-driven (i.e., emit light) with the driving current supplied from the driving transistor DR during an odd frame and can be off-driven (i.e., can not emit light) during an even frame. An anode voltage of the first light emitting device OLED1 can be discharge-driven with the low-level pixel source voltage EVSS through the internal resistor during an even frame.

The second light emitting device OLED2 can be on-driven (i.e., emit light) with the driving current supplied from the driving transistor DR during an even frame and can be off-driven (i.e., can not emit light) during an odd frame. An anode voltage of the second light emitting device OLED2 can be discharge-driven with the low-level pixel source voltage EVSS through the internal resistor during an odd frame.

The first emission transistor ET1 and the second emission transistor ET2 can be for on-off alternating driving of the first light emitting device OLED1 and the second light emitting device OLED2.

In response to a first emission signal EM1, the first emission transistor ET1 can connect a first anode electrode of the first light emitting device OLED1 to the source node DTS in an odd frame and can disconnect the first anode electrode of the first light emitting device OLED1 from the source node DTS during an even frame. The first emission transistor ET1 can include a gate electrode connected to a first emission line EL1, a drain electrode connected to the source node DTS, and a source electrode connected to the first anode electrode of the first light emitting device OLED1.

In response to a second emission signal EM2, the second emission transistor ET2 can connect a second anode electrode of the second light emitting device OLED2 to the source node DTS in an even frame and can disconnect the second anode electrode of the second light emitting device OLED2 from the source node DTS during an odd frame. The second emission transistor ET2 can include a gate electrode connected to a second emission line EL2, a drain electrode connected to the source node DTS, and a source electrode connected to the second anode electrode of the second light emitting device OLED2.

Referring to FIGS. 4A and 4B, one frame can include a first initialization period X1 and Y1, a threshold voltage sampling period X2 and Y2, a data writing period X3 and Y3, a second initialization period X4 and Y4, and an emission period X5 and Y5.

The first emission signal EM1 can be input at an on level Lon in the first initialization period X1 and the emission period X5 of an odd frame and can be input at an off level Loff in the threshold voltage sampling period X2, the data writing period X3, and the second initialization period X4 of the odd frame. The first emission signal EM1 can be input at the off level Loff during all periods Y1 to Y5 including the emission period Y5 of an even frame.

In response to the first emission signal EM1, the first emission transistor ET1 can be powered on during the first initialization period X1 and the emission period X5 of the odd frame and can be powered off during all periods Y1 to Y5 of the even frame.

Therefore, the first light emitting device OLED1 can be on-driven during the emission period X5 of the odd frame and can be off-driven during all periods Y1 to Y5 of the even frame.

The second emission signal EM2 can be input at the on level Lon in the first initialization period Y1 and the emission period Y5 of the even frame and can be input at the off level Loff in the threshold voltage sampling period Y2, the data writing period Y3, and the second initialization period Y4 of the even frame. The second emission signal EM2 can be input at the off level Loff during all periods X1 to X5 including the emission period X5 of the odd frame.

In response to the second emission signal EM2, the second emission transistor ET2 can be powered on during the first initialization period Y1 and the emission period Y5 of the even frame and can be powered off during all periods X1 to X5 of the odd frame.

Therefore, the second light emitting device OLED2 can be on-driven during the emission period Y5 of the even frame and can be off-driven during all periods X1 to X5 of the odd frame.

Referring further to FIG. 2, the pixel PXL according to aspects of the present disclosure can further supply an external reset voltage Var to an anode electrode of a corresponding light emitting device which is off-driven, so as to more effectively initialize the light emitting device prior to on driving. To this end, the pixel PXL according to aspects of the present disclosure can further include a first scan transistor ST1 and a second scan transistor ST2.

The first scan transistor ST1 can further supply a reset voltage Var to the first anode electrode of the first light emitting device OLED1, based on a first scan signal SCAN1. The first scan transistor ST1 can include a gate electrode connected to a first scan line SL1, a drain electrode connected to an input terminal of the reset voltage Var, and a source electrode connected to the first anode electrode of the first light emitting device OLED1.

The second scan transistor ST2 can further supply the reset voltage Var to the second anode electrode of the second light emitting device OLED2, based on a second scan signal SCAN2. The second scan transistor ST2 can include a gate electrode connected to a second scan line SL2, a drain electrode connected to the input terminal of the reset voltage Var, and a source electrode connected to the second anode electrode of the second light emitting device OLED2.

Referring further to FIGS. 4A and 4B, the first scan signal SCAN1 can be input at the on level Lon in the other periods X1 to X4 except the emission period X5 of the odd frame and all periods Y1 to Y5 including the emission period Y5 of the even frame. On the other hand, the second scan signal SCAN2 can be input at the on level Lon in the other periods Y1 to Y4 except the emission period Y5 of the even frame and all periods X1 to X5 including the emission period X5 of the odd frame.

In response to the first scan signal SCAN1, the first scan transistor ST1 can be powered on during all periods Y1 to Y5 of the even frame and can initialize the first anode electrode of the first light emitting device OLED1 to the reset voltage Var. Also, in response to the second scan signal SCAN2, the second scan transistor ST2 can be powered on during all periods X1 to X5 of the odd frame and can initialize the second anode electrode of the second light emitting device OLED2 to the reset voltage Var.

Here, the reset voltage Var can be less than a data voltage representing a black gray level, for stable off driving. For example, when the data voltage representing a black gray level is 0.5 V, the reset voltage Var can be set to −3 V.

As described above, according to aspects of the present disclosure, an anode voltage of a light emitting device can be equally initialized in all frames regardless of a gray level of a previous frame. As a result, as in FIG. 5, a luminance of a first frame immediately after being changed from a black gray level to a white gray level can be substantially the same as that of a next frame maintaining a white gray level. This can denote that an SAR decreases to 0%.

Referring further to FIG. 2, the pixel PXL according to aspects of the present disclosure can further include a node control circuit CPG for programming a voltage difference (hereinafter referred to as Vgs) between the gate node DTG and the source node DTS before the first or second light emitting device OLED1 or OLED2 in each of an odd frame and an even frame. A configuration of the node control circuit CPG can be variously modified.

For example, the node control circuit CPG can be connected to the data line 14 so as to receive a data voltage Vdata, can be further connected to third and fourth scan lines SL3 and SL4 so as to further receive third and fourth scan signals SCAN3 and SCAN4, can be further connected to a third emission line EL3 so as to further receive a third emission signal EM3, can be connected to the reference voltage power line so as to receive the reference voltage Vref, and can be connected to the high-level power line so as to receive the high-level pixel source voltage EVDD.

Figure 6:
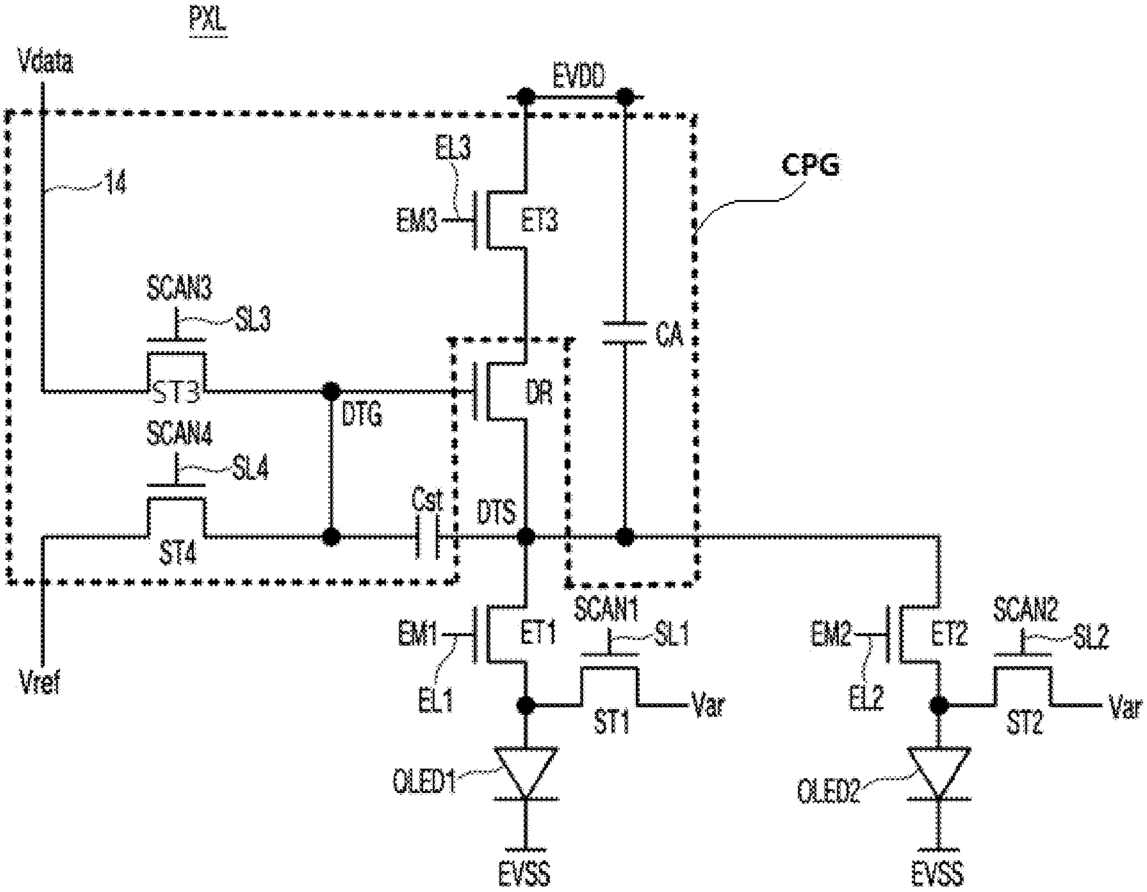
FIG. 6 is a diagram illustrating a configuration of a pixel circuit according to one or more embodiments of the present disclosure.

A configuration of a pixel circuit including a configuration of a node control circuit CPG according to an embodiment of the present disclosure is illustrated in FIG. 6. In FIG. 6, the other elements except the node control circuit CPG can be the same as FIG. 2.

Referring to FIG. 6, the node control circuit CPG can include a third scan transistor ST3 for supplying a data voltage Vdata to a gate node DTG, a fourth scan transistor ST4 for supplying a reference voltage Vref to the gate node DTG, a third emission transistor ET3 for supplying a high-level pixel source voltage EVDD to a driving transistor DR, a first capacitor Cst, and a second capacitor CA.

The third scan transistor ST3 can include a gate electrode connected to a third scan line SL3, a drain electrode connected to a data line 14, and a source electrode connected to the gate node DTG.

The fourth scan transistor ST4 can include a gate electrode connected to a fourth scan line SL4, a drain electrode connected to a reference voltage power line, and a source electrode connected to the gate node DTG.

The third emission transistor ET3 can include a gate electrode connected to a third emission line EL3, a drain electrode connected to an input terminal of the high-level pixel source voltage EVDD, and a source electrode connected to a drain electrode of a driving transistor DR.

One electrode of the first capacitor Cst can be connected to the gate node DTG, and the other electrode of the first capacitor Cst can be connected to a source node DTS.

One electrode of the second capacitor CA can be connected to the input terminal of the high-level pixel source voltage EVDD, and the other electrode of the second capacitor CA can be connected to the source node DTS.

Figure 7:
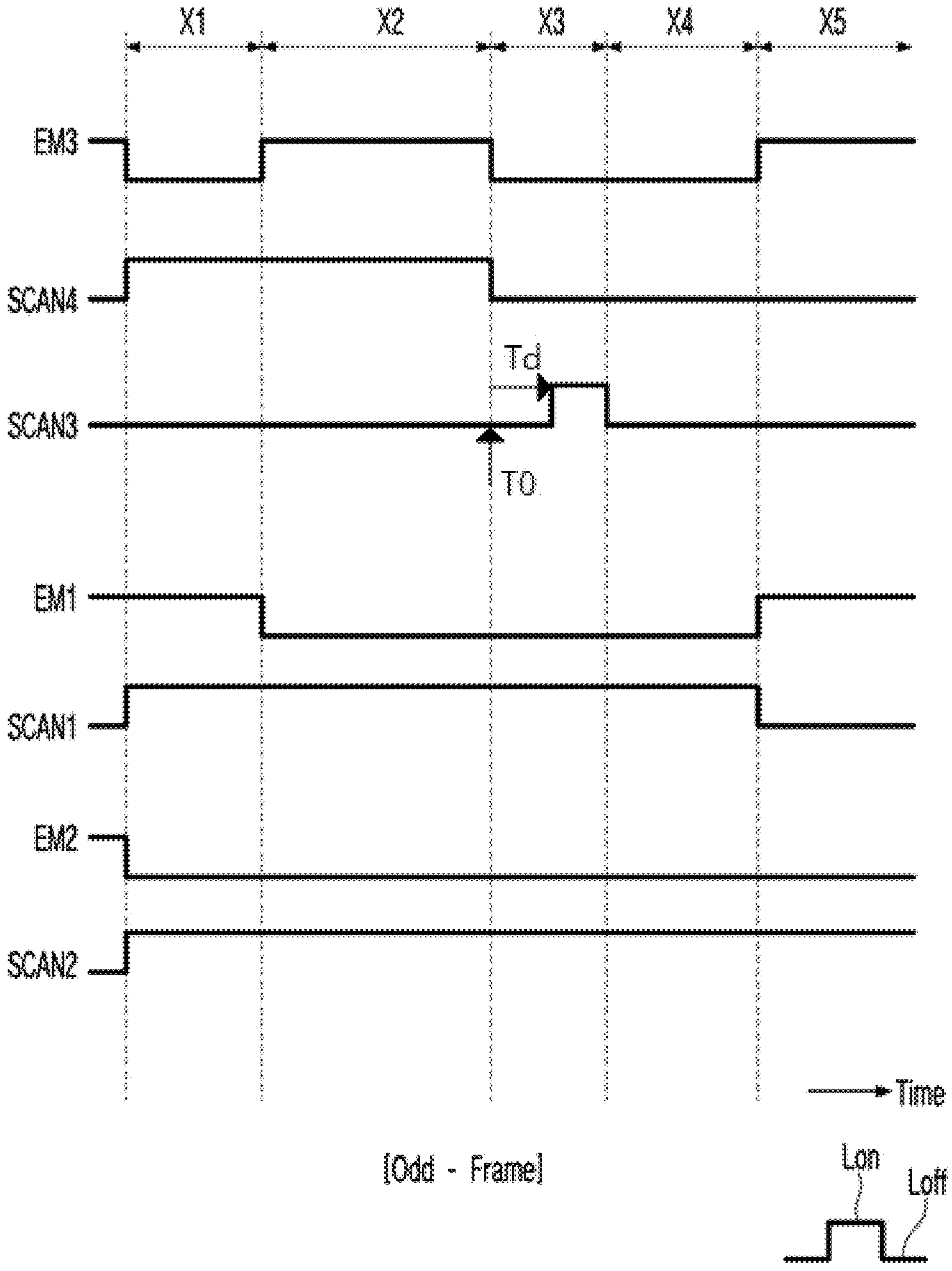
FIG. 7 is a driving waveform diagram of a pixel circuit of FIG. 6 in an odd frame.
Figure 8A:
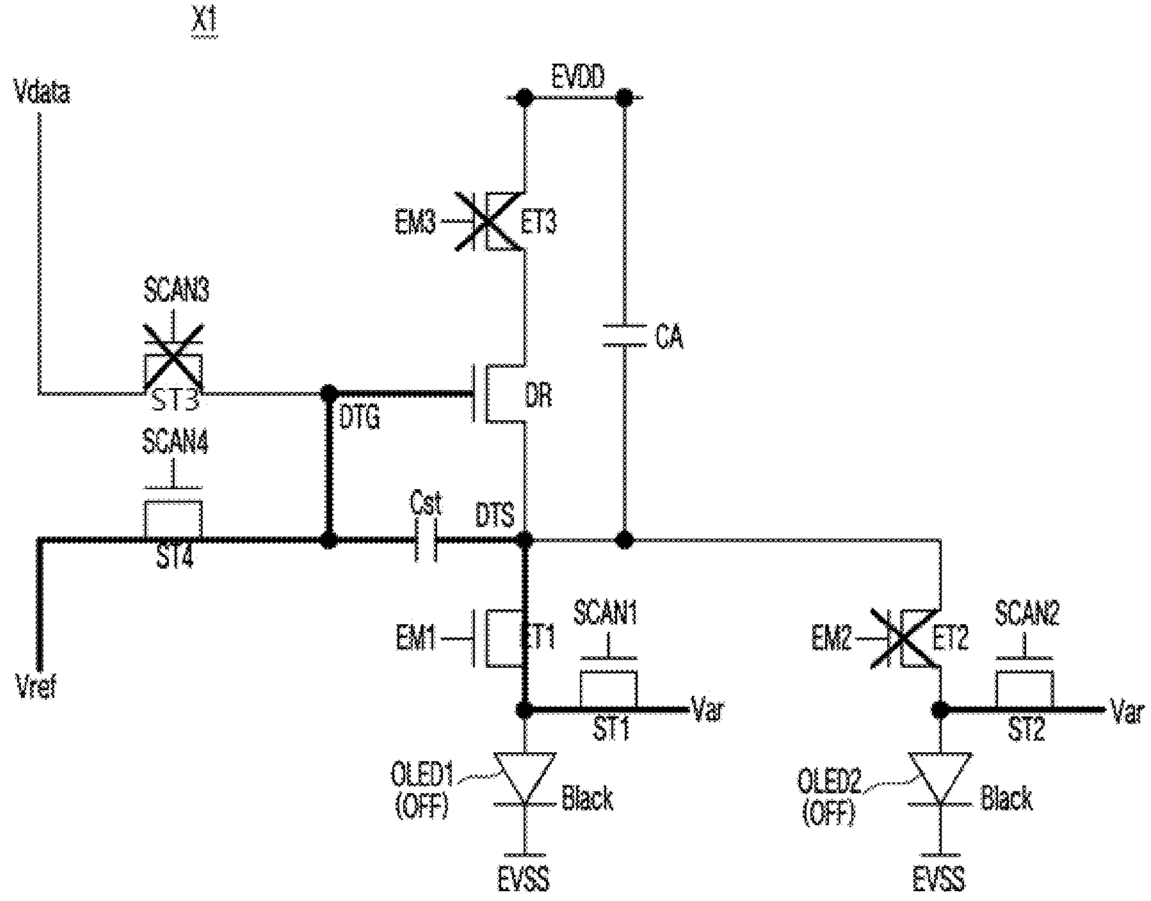
FIG. 8A is a diagram illustrating an operation of the pixel circuit of FIG. 7 in a first initialization period of an odd frame.
Figure 8B:
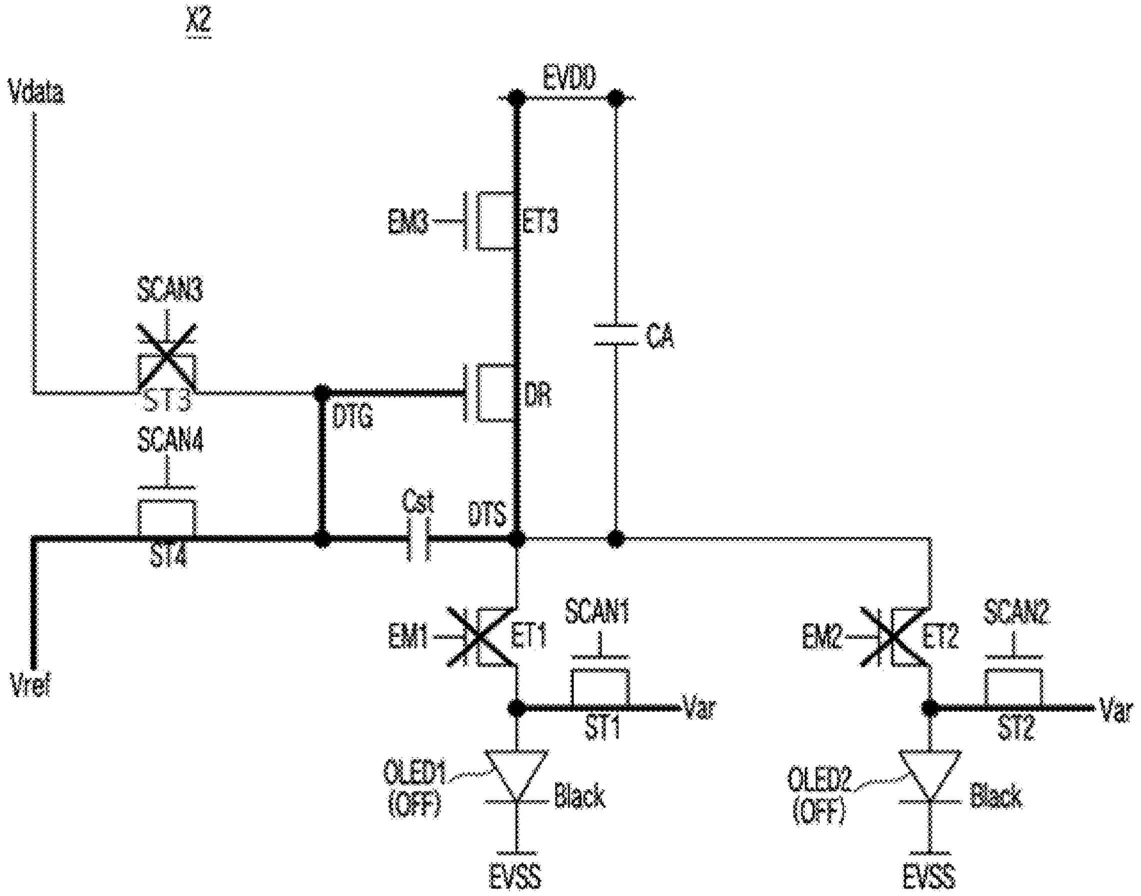
FIG. 8B is a diagram illustrating an operation of the pixel circuit of FIG. 7 in a threshold voltage sampling period of an odd frame.
Figure 8C:
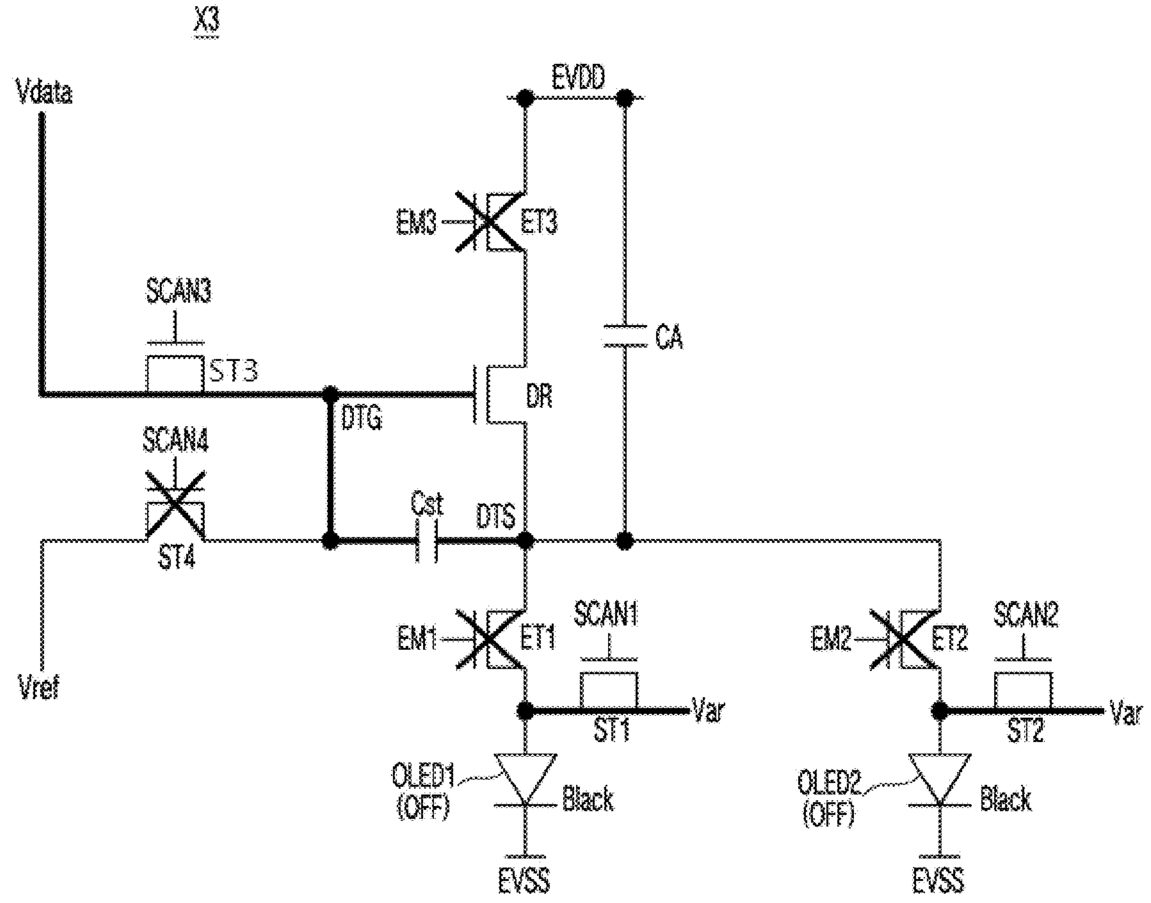
FIG. 8C is a diagram illustrating an operation of the pixel circuit of FIG. 7 in a data writing period of an odd frame.
Figure 8D:
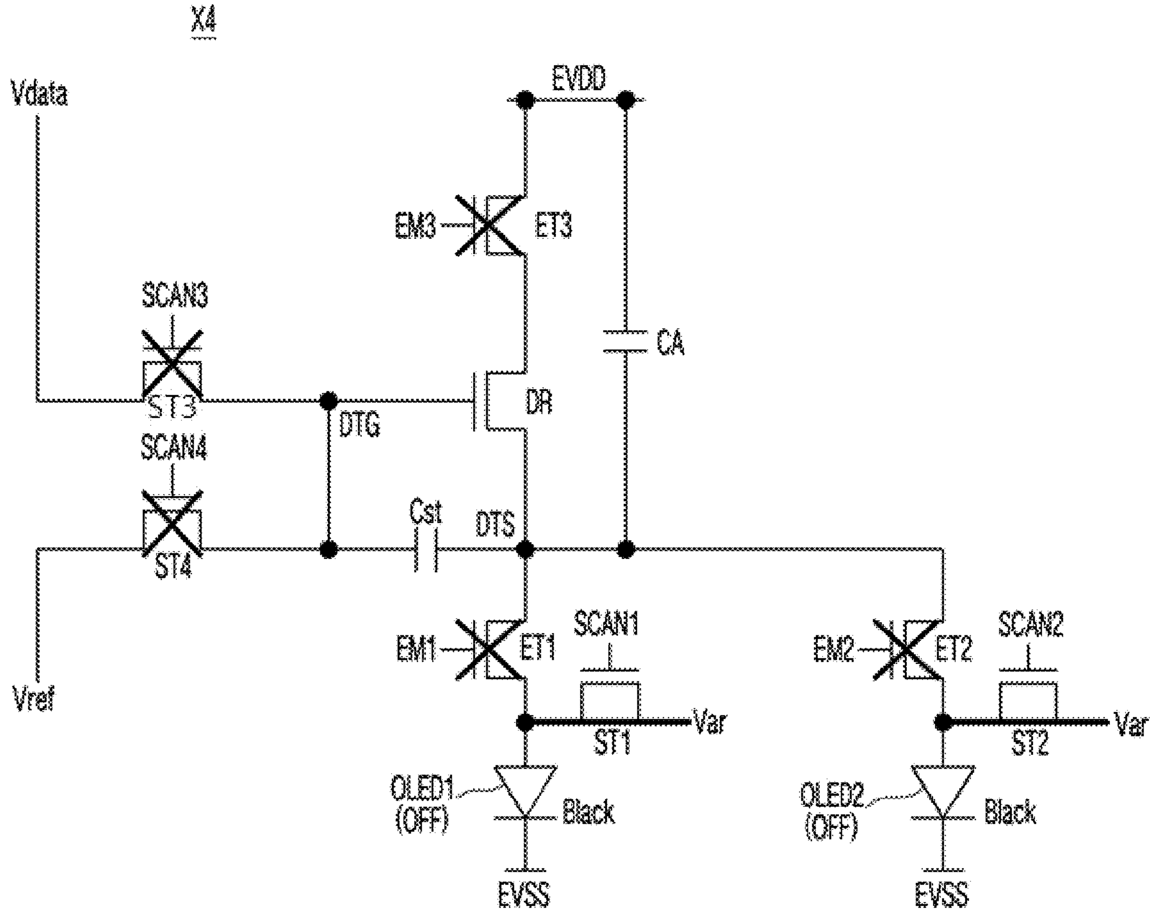
FIG. 8D is a diagram illustrating an operation of the pixel circuit of FIG. 7 in a second initialization period of an odd frame.
Figure 8E:
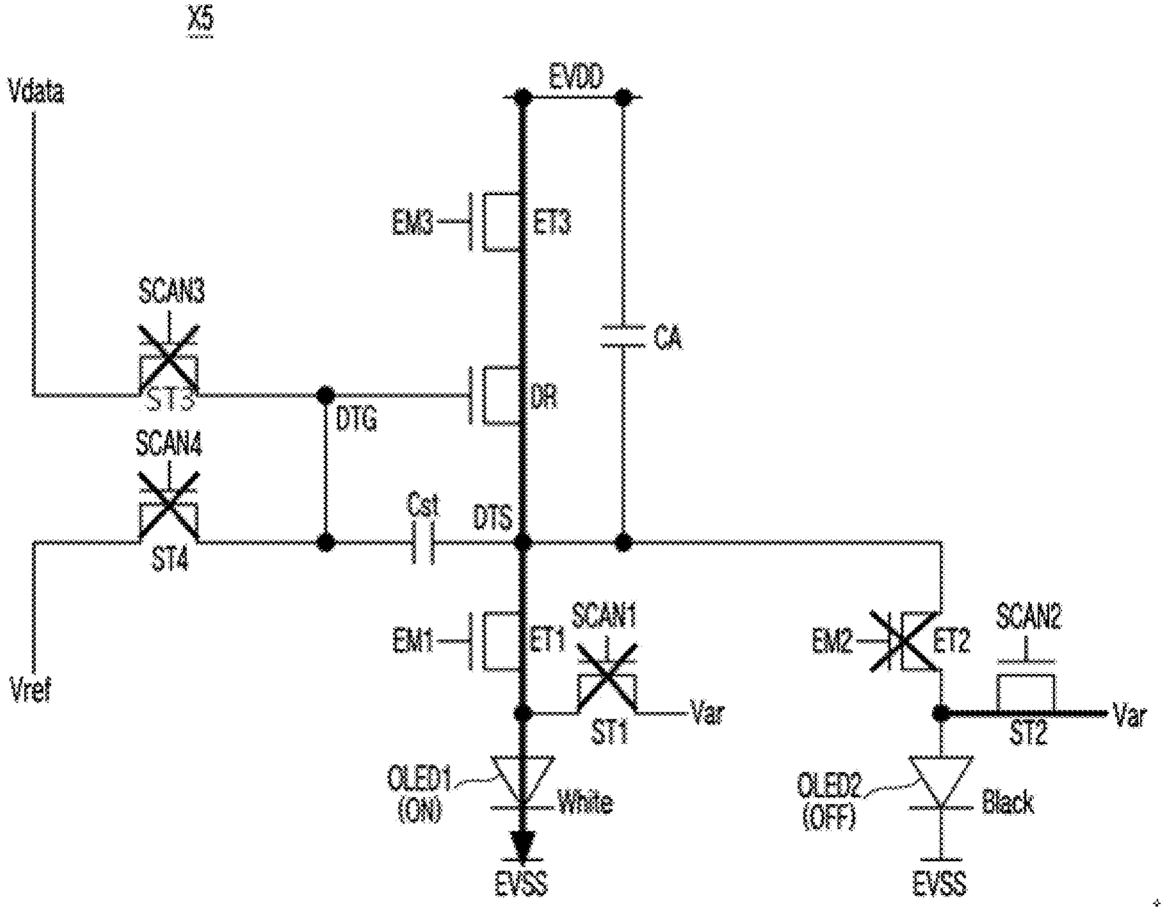
FIG. 8E is a diagram illustrating an operation of the pixel circuit of FIG. 7 in an emission period of an odd frame.

FIG. 7 is a driving waveform diagram of the pixel circuit of FIG. 6 in an odd frame. FIG. 8A is a diagram illustrating an operation of a pixel circuit in a first initialization period of an odd frame according to an example of the present disclosure. FIG. 8B is a diagram illustrating an operation of a pixel circuit in a threshold voltage sampling period of an odd frame according to an example of the present disclosure. FIG. 8C is a diagram illustrating an operation of a pixel circuit in a data writing period of an odd frame according to an example of the present disclosure. FIG. 8D is a diagram illustrating an operation of a pixel circuit in a second initialization period of an odd frame according to an example of the present disclosure. FIG. 8E is a diagram illustrating an operation of a pixel circuit in an emission period of an odd frame according to an example of the present disclosure.

Referring to FIGS. 7 and 8A, in a first initialization period X1 of an odd frame, a first scan transistor ST1 can be powered on based on a first scan signal SCAN1 of an on level Lon, a second scan transistor ST2 can be powered on based on a second scan signal SCAN2 of the on level Lon, a fourth scan transistor ST4 can be powered on based on a fourth scan signal SCAN4 of the on level Lon, and a first emission transistor ET1 can be powered on based on a first emission signal EM1 of the on level Lon. Also, the other transistors DR, ST3, ET2, and ET3 can be powered off.

As a result, in the first initialization period X1 of the odd frame, a gate node DTG can be initialized to a reference voltage Vref, and a source node DTS can be initialized to a reset voltage Var. For the stability of an operation, the reference voltage Vref can be set to be greater than a data voltage representing a black gray level, and the reset voltage Var can be set to be less than the data voltage representing a black gray level. For example, when the data voltage representing a black gray level is 0.5 V, the reset voltage Var can be set to −3 V, and the reference voltage Vref can be set to 1.5 V.

Referring to FIGS. 7 and 8B, in a threshold voltage sampling period X2 of the odd frame, the first scan transistor ST1 can be powered on based on the first scan signal SCAN1 of the on level Lon, the second scan transistor ST2 can be powered on based on the second scan signal SCAN2 of the on level Lon, the fourth scan transistor ST4 can be powered on based on the fourth scan signal SCAN4 of the on level Lon, a third emission transistor ET3 can be powered on based on a third emission signal EM3 of the on level Lon, and a driving transistor DR can be powered on. Also, the other transistors ST3, ET1, and ET2 can be powered off.

As a result, in the threshold voltage sampling period X2 of the odd frame, a threshold voltage of the driving transistor DR can be sampled and can be stored in the first capacitor Cst. In the threshold voltage sampling period X2 of the odd frame, an electric potential of the gate node DTG can be the reference voltage Vref, and an electric potential of the source node DTS can be "Vref-Vth". Here, Vth can denote a threshold voltage of the driving transistor DR.

Referring to FIGS. 7 and 8C, in a data writing period X3 of the odd frame, the first scan transistor ST1 can be powered on based on the first scan signal SCAN1 of the on level Lon, the second scan transistor ST2 can be powered on based on the second scan signal SCAN2 of the on level Lon, and a third scan transistor ST3 can be powered on based on a third scan signal SCAN3 of the on level Lon. Also, the other transistors DR, ST4, ET1, ET2, and ET3 can be powered off.

As a result, in the data writing period X3 of the odd frame, a data voltage Vdata representing a white gray level can be supplied to the gate node DTG. In the data writing period X3 of the odd frame, an electric potential of the gate node DTG can be the data voltage Vdata, and an electric potential of the source node DTS can be "Vref−Vth+C (Vdata−Vref)". Here, C can denote a value obtained by dividing a capacitance of the first capacitor Cst by a sum of the capacitance of the first capacitor Cst and a capacitance of the second capacitor CA.

Furthermore, the third scan signal SCAN3 can be delayed for a certain time Td from a start timing TO of the data writing period X3 and can then be shifted to the on level Lon, thereby preventing an abnormal short circuit between the data line DL and the input terminal of the reference voltage Vref which occurs because the third scan transistor ST3 and the fourth scan transistor ST4 are simultaneously powered on at the moment (i.e., TO) the threshold voltage sampling period X2 is changed to the data writing period X3.

Referring to FIGS. 7 and 8D, in a second initialization period X4 of the odd frame, the first scan transistor ST1 can be powered on based on the first scan signal SCAN1 of the on level Lon, and the second scan transistor ST2 can be powered on based on the second scan signal SCAN2 of the on level Lon. Also, the other transistors DR, ST3, ST4, ET1, ET2, and ET3 can be powered off.

As a result, the reset voltage Var can be supplied to a first anode electrode of a first light emitting device OLED1 and a second anode electrode of a second light emitting device OLED2. An electric potential of the first anode electrode and an electric potential of the second anode electrode can maintain the reset voltage Var continuously up to the second initialization period X4 from the first initialization period X1.

Based on the reset voltage Var maintained by the first and second anode electrodes up to the second initialization period X4 from the first initialization period X1, the first anode electrode of the first light emitting device OLED1 and the second anode electrode of the second light emitting device OLED2 can be equally initialized (or discharged) regardless of a gray level of a previous frame.

The first light emitting device OLED1 and the second light emitting device OLED2 can be powered off (or can not emit light) up to the second initialization period X4 from the first initialization period X1, and thus, an image of a black gray level can be implemented.

Referring to FIGS. 7 and 8E, in an emission period X5 of the odd frame, the second scan transistor ST2 can be powered on based on the second scan signal SCAN2 of the on level Lon, a first emission transistor ET1 can be powered on based on a first emission signal EM1 of the on level Lon, a third emission transistor ET3 can be powered on based on the third emission signal EM3 of the on level Lon, and the driving transistor DR can be powered on. Also, the other transistors ST1, ST3, ST4, and ET2 can be powered off.

In an emission period X5 of the odd frame, an electric potential of the gate node DTG can be "Vdata+Voled", and an electric potential of the source node DTS can be "Vref−Vth+C(Vdata−Vref)+Voled". Here, Voled can be a turn-on voltage (or an operation point voltage) of the first light emitting device OLED1.

A potential difference between the gate node DTG and the source node DTS determining a level of a driving current can be "Vdata−Vref−C(Vdata−Vref)+Vth". Accordingly, the driving current Ioled can be expressed as in the following Equation 1.

$$Ioled = k/2\{(1-C)*(Vdata-Vref)\}^2 \quad \text{[Equation 1]}$$

As in Equation 1, the driving current Ioled can be compensated for regardless of a threshold voltage Vth shift of the driving transistor DR, and the first light emitting device OLED1 can be powered on (or emit light) by the driving current Ioled during the emission period X5 of the odd frame, thereby implementing an image of a white gray level.

On the other hand, during an entire period of the odd frame, the second light emitting device OLED2 can maintain an off state and can thus be initialization-driven (or discharge).

Figure 9:
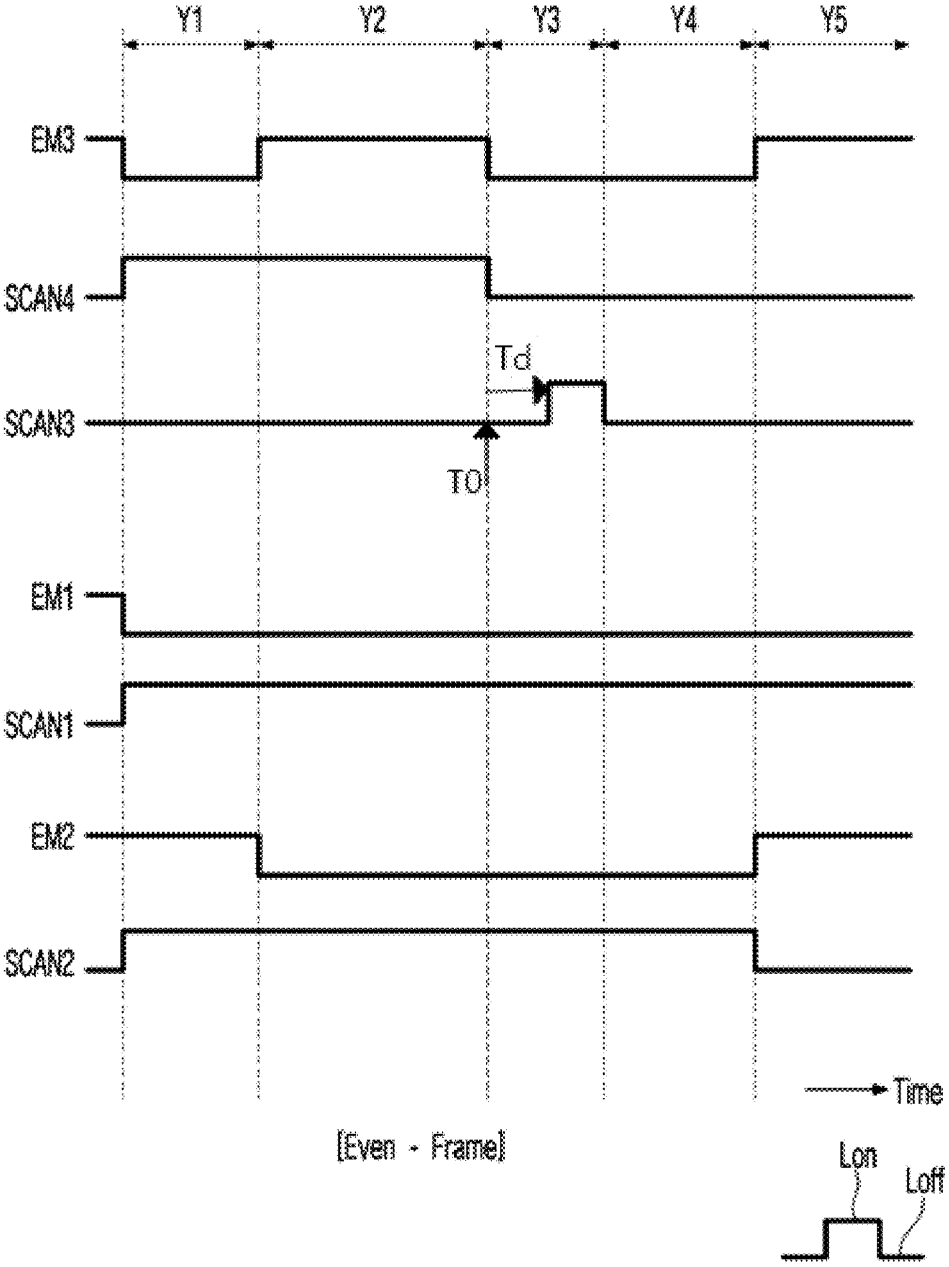
FIG. 9 is a driving waveform diagram of a pixel circuit of FIG. 6 in an even frame.
Figure 10A:
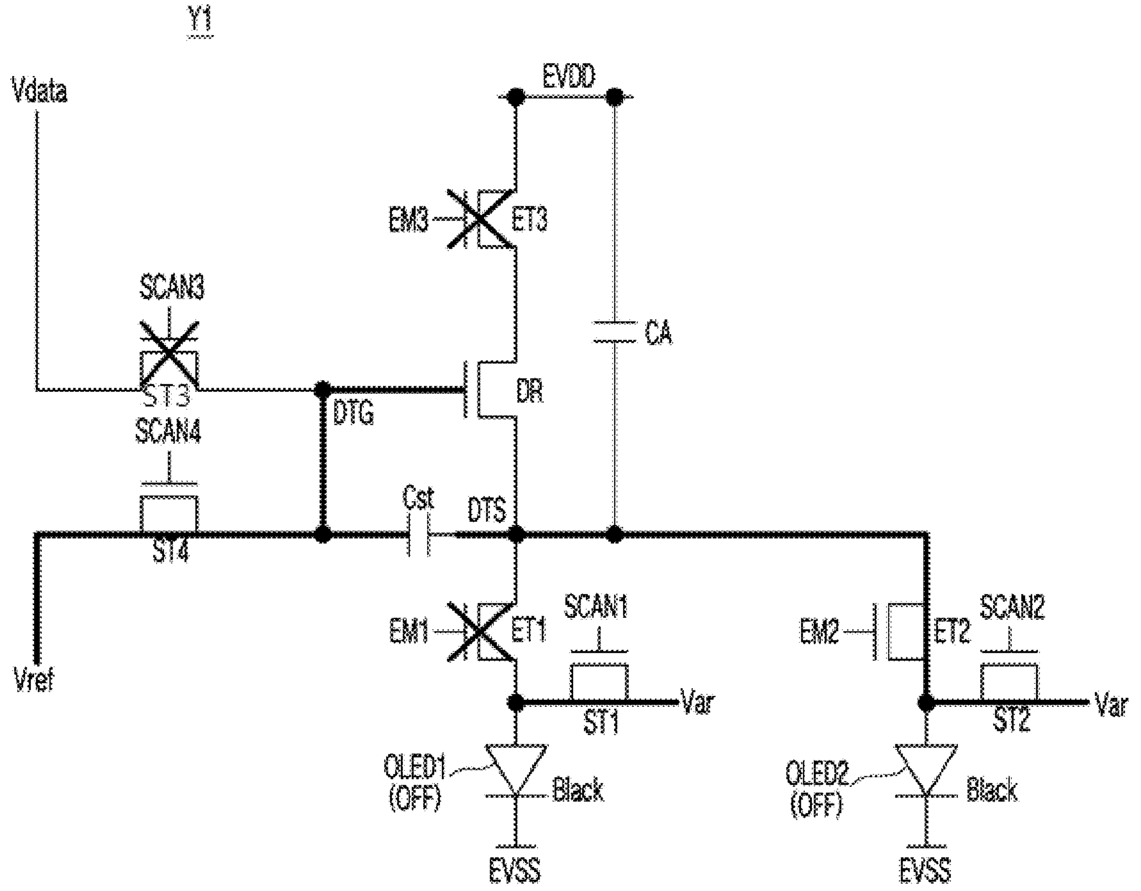
FIG. 10A is a diagram illustrating an operation of the pixel circuit of FIG. 9 in a first initialization period of an even frame.
Figure 10B:
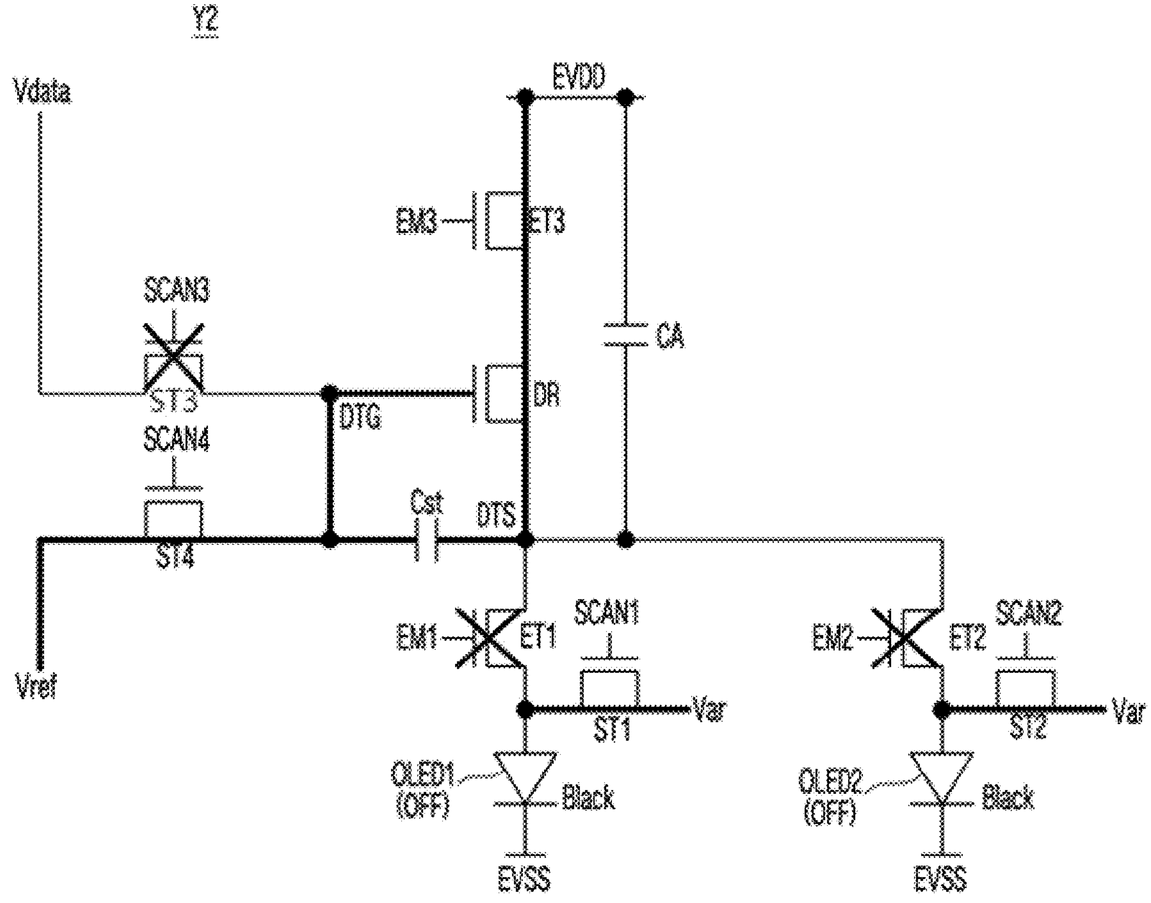
FIG. 10B is a diagram illustrating an operation of the pixel circuit of FIG. 9 in a threshold voltage sampling period of an even frame.
Figure 10C:
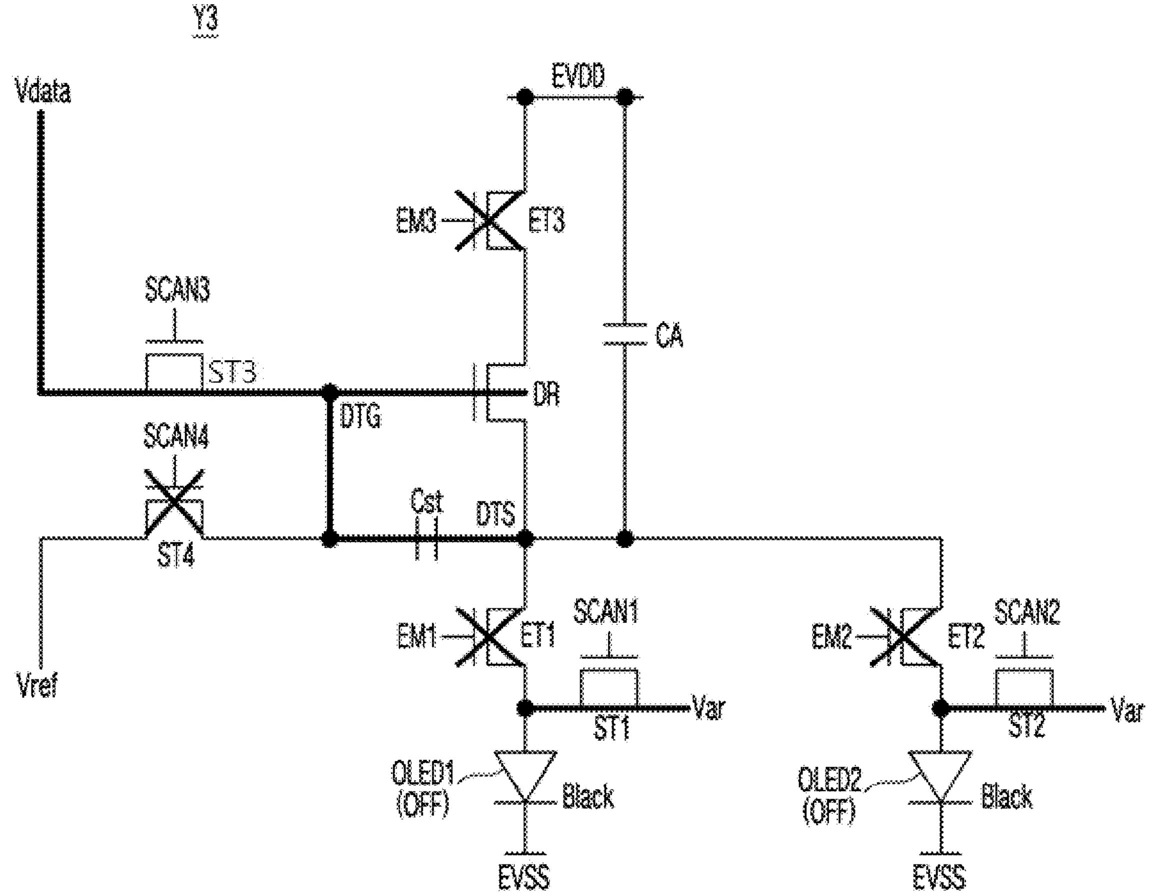
FIG. 10C is a diagram illustrating an operation of the pixel circuit of FIG. 9 in a data writing period of an even frame.
Figure 10D:
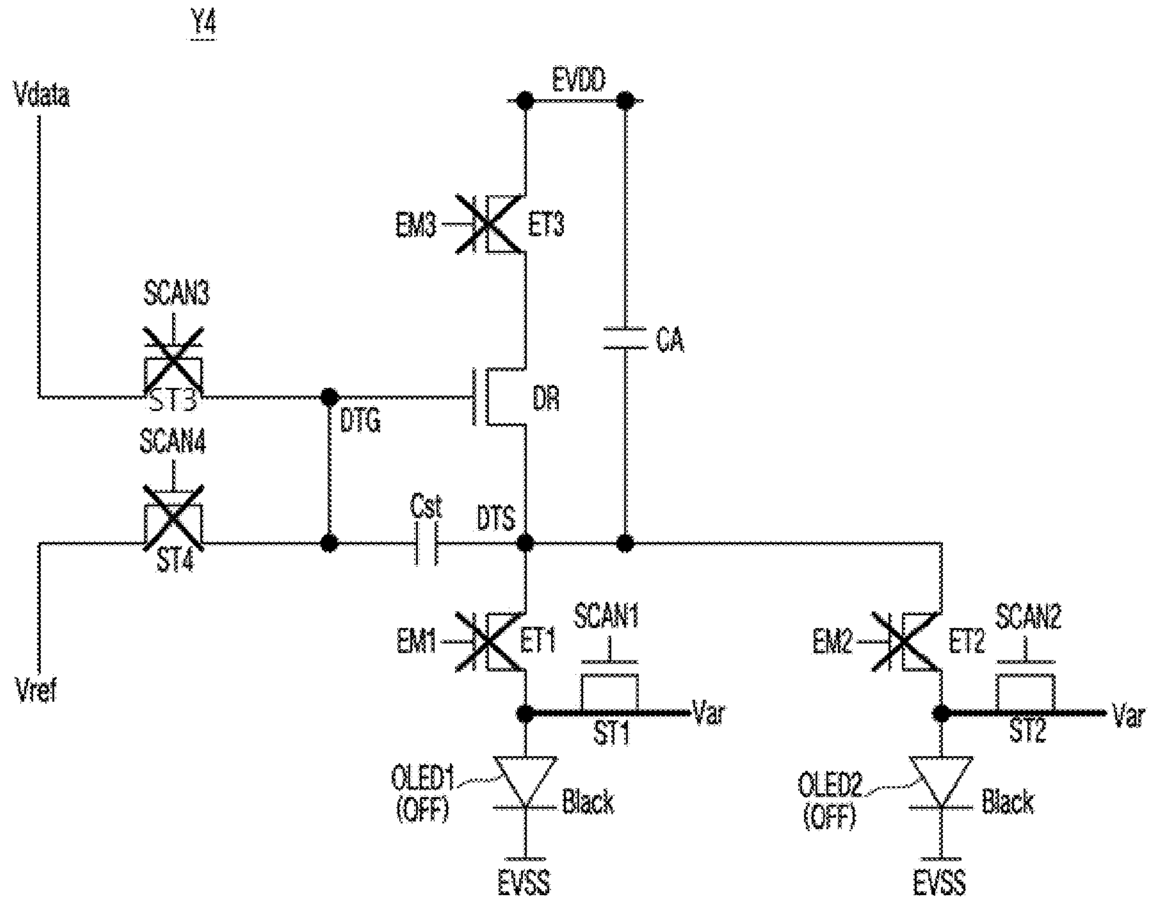
FIG. 10D is a diagram illustrating an operation of the pixel circuit of FIG. 9 in a second initialization period of an even frame.
Figure 10E:
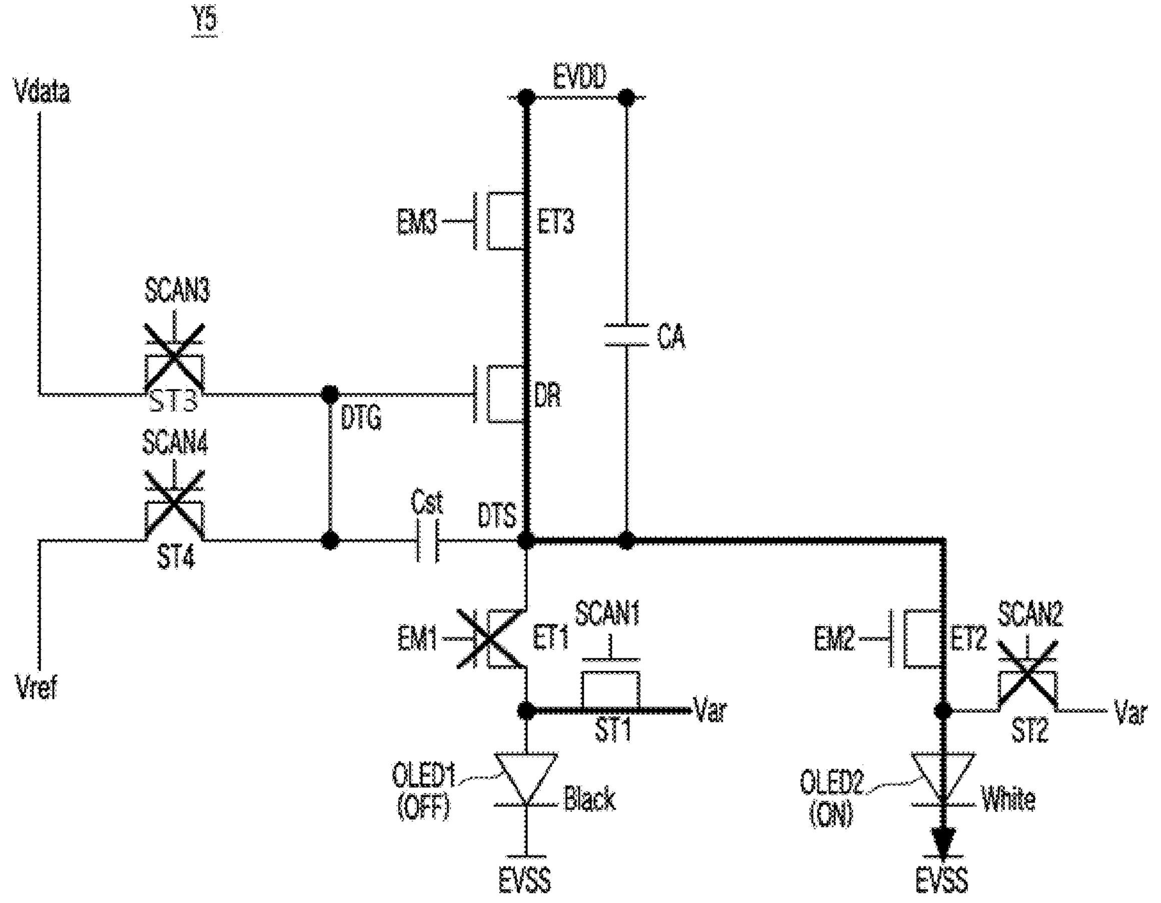
FIG. 10E is a diagram illustrating an operation of the pixel circuit of FIG. 9 in an emission period of an even frame.

FIG. 9 is a driving waveform diagram of a pixel circuit of FIG. 6 in an even frame. FIG. 10A is a diagram illustrating an operation of a pixel circuit in a first initialization period of an even frame according to an example of the present disclosure. FIG. 10B is a diagram illustrating an operation of a pixel circuit in a threshold voltage sampling period of an even frame according to an example of the present disclosure. FIG. 10C is a diagram illustrating an operation of a pixel circuit in a data writing period of an even frame according to an example of the present disclosure. FIG. 10D is a diagram illustrating an operation of a pixel circuit in a second initialization period of an even frame according to an example of the present disclosure. FIG. 10E is a diagram illustrating an operation of a pixel circuit in an emission period of an even frame according to an example of the present disclosure.

Referring to FIGS. 9 and 10A, in a first initialization period Y1 of an even frame, a first scan transistor ST1 can be powered on based on a first scan signal SCAN1 of an on level Lon, a second scan transistor ST2 can be powered on based on a second scan signal SCAN2 of the on level Lon, a fourth scan transistor ST4 can be powered on based on a fourth scan signal SCAN4 of the on level Lon, and a second emission transistor ET2 can be powered on based on a second emission signal EM2 of the on level Lon. Also, the other transistors DR, ST3, ET1, and ET3 can be powered off.

As a result, in the first initialization period Y1 of the even frame, a gate node DTG can be initialized to a reference voltage Vref, and a source node DTS can be initialized to a reset voltage Var.

Referring to FIGS. 9 and 10B, in a threshold voltage sampling period Y2 of the even frame, the first scan transistor ST1 can be powered on based on the first scan signal SCAN1 of the on level Lon, the second scan transistor ST2 can be powered on based on the second scan signal SCAN2 of the on level Lon, the fourth scan transistor ST4 can be powered on based on the fourth scan signal SCAN4 of the on level Lon, a third emission transistor ET3 can be powered on based on a third emission signal EM3 of the on level Lon, and a driving transistor DR can be powered on. Also, the other transistors ST3, ET1, and ET2 can be powered off.

As a result, in the threshold voltage sampling period Y2 of the even frame, a threshold voltage of the driving transistor DR can be sampled and can be stored in the first capacitor Cst. In the threshold voltage sampling period Y2 of the even frame, an electric potential of the gate node DTG can be the reference voltage Vref, and an electric potential of the source node DTS can be "Vref−Vth". Here, Vth can denote a threshold voltage of the driving transistor DR.

Referring to FIGS. 9 and 10C, in a data writing period Y3 of the even frame, the first scan transistor ST1 can be powered on based on the first scan signal SCAN1 of the on level Lon, the second scan transistor ST2 can be powered on based on the second scan signal SCAN2 of the on level Lon, and a third scan transistor ST3 can be powered on based on a third scan signal SCAN3 of the on level Lon. Also, the other transistors DR, ST4, ET1, ET2, and ET3 can be powered off.

As a result, in the data writing period Y3 of the even frame, a data voltage Vdata representing a white gray level can be supplied to the gate node DTG. In the data writing period Y3 of the even frame, an electric potential of the gate node DTG can be the data voltage Vdata, and an electric potential of the source node DTS can be "Vref−Vth+C (Vdata−Vref)". Here, C can denote a value obtained by dividing a capacitance of the first capacitor Cst by a sum of the capacitance of the first capacitor Cst and a capacitance of the second capacitor CA.

Furthermore, the third scan signal SCAN3 can be delayed for a certain time Td from a start timing TO of the data writing period Y3 and can then be shifted to the on level Lon, thereby preventing an abnormal short circuit between the data line DL and the input terminal of the reference voltage Vref which occurs because the third scan transistor ST3 and the fourth scan transistor ST4 are simultaneously powered on at the moment (i.e., TO) the threshold voltage sampling period Y2 is changed to the data writing period Y3.

Referring to FIGS. 9 and 10D, in a second initialization period Y4 of the even frame, the first scan transistor ST1 can be powered on based on the first scan signal SCAN1 of the on level Lon, and the second scan transistor ST2 can be powered on based on the second scan signal SCAN2 of the on level Lon. Also, the other transistors DR, ST3, ST4, ET1, ET2, and ET3 can be powered off.

As a result, the reset voltage Var can be supplied to a first anode electrode of a first light emitting device OLED1 and a second anode electrode of a second light emitting device OLED2. An electric potential of the first anode electrode and an electric potential of the second anode electrode can maintain the reset voltage Var continuously up to the second initialization period Y4 from the first initialization period Y1.

Based on the reset voltage Var maintained by the first and second anode electrodes up to the second initialization period Y4 from the first initialization period Y1, the first anode electrode of the first light emitting device OLED1 and the second anode electrode of the second light emitting device OLED2 can be equally initialized (or discharged) regardless of a gray level of a previous frame.

The first light emitting device OLED1 and the second light emitting device OLED2 can be powered off (or can not emit light) up to the second initialization period Y4 from the first initialization period Y1, and thus, an image of a black gray level can be implemented.

Referring to FIGS. 9 and 10E, in an emission period Y5 of the even frame, the first scan transistor ST1 can be powered on based on the first scan signal SCAN1 of the on level Lon, a second emission transistor ET2 can be powered on based on a second emission signal EM2 of the on level Lon, a third emission transistor ET3 can be powered on based on the third emission signal EM3 of the on level Lon, and the driving transistor DR can be powered on. Also, the other transistors ST2, ST3, ST4, and ET1 can be powered off.

In an emission period Y5 of the even frame, an electric potential of the gate node DTG can be "Vdata+Voled", and an electric potential of the source node DTS can be "Vref−Vth+C(Vdata−Vref)+Voled". Here, Voled can be a turn-on voltage (or an operation point voltage) of the second light emitting device OLED2.

A potential difference Vgs between the gate node DTG and the source node DTS determining a level of a driving current can be "Vdata−Vref-C(Vdata−Vref)+Vth". Accordingly, the driving current Ioled can be expressed as in Equation 1.

As in Equation 1, the driving current Ioled can be compensated for regardless of a threshold voltage Vth shift of the driving transistor DR, and the second light emitting device OLED2 can be powered on (or emit light) by the driving current Ioled during the emission period Y5 of the even frame, thereby implementing an image of a white gray level.

On the other hand, during an entire period of the even frame, the second light emitting device OLED2 can maintain an off state and can thus be initialization-driven (or discharge).

As described above, in a case where a gray level of image data applied to a pixel is changed from black to white and then maintains a white gray level during several frames, the present disclosure can reduce or minimize a luminance deviation between a first frame immediately after being changed to a white gray level and the other frames maintaining a white gray level, thereby increasing display quality.

The effects and advantages according to the present disclosure are not limited to the above examples, and other various effects and advantages can be included in the specification and/or part of the present disclosure without a specific discussion herein.

While the present disclosure has been particularly shown and described with reference to example embodiments thereof, it will be understood by those of ordinary skill in the art that various changes in form and details can be made therein without departing from the spirit and scope of the present disclosure as defined by the following claims.

What is claimed is:

1. A pixel circuit comprising:

a driving transistor including a gate electrode connected to a gate node and a source electrode connected to a source node, and configured to generate a driving current;

a first light emitting device including a first anode electrode and configured to emit light in response to the driving current;

a second light emitting device including a second anode electrode and configured to emit light in response to the driving current;

a first emission transistor configured to connect the source node to the first anode electrode in an odd frame and disconnect the source node from the first anode electrode during an even frame, in response to a first emission signal;

a second emission transistor configured to connect the source node to the second anode electrode in the even frame and disconnect the source node from the second anode electrode during the odd frame, in response to a second emission signal;

a first scan transistor configured to supply a reset voltage to the first anode electrode based on a first scan signal; and a second scan transistor configured to supply the reset voltage to the second anode electrode based on a second scan signal, wherein the first light emitting device is turned on during an emission period of the odd frame and maintains an off state during the even frame, and the second light emitting device is turned on during an emission period of the even frame and maintains an off state during the odd frame, and wherein the first scan transistor is turned on in another period, except the emission period, of the odd frame and is turned on in all periods of the even frame, and the second scan transistor is turned on in another period, except the emission period, of the even frame and is turned on in all periods of the odd frame.

2. The pixel circuit of claim 1, wherein the first emission transistor is turned on during the emission period of the odd frame and is turned off during all periods of the even frame, and wherein the second emission transistor is turned on during the emission period of the even frame and is turned off during all periods of the odd frame.

3. The pixel circuit of claim 1, wherein, in a data writing period preceding the emission period of the odd frame or a data writing period preceding the emission period of the even frame, a data voltage included in a predetermined voltage range is applied to the gate node so as to implement a gray level, and wherein the reset voltage is less than a lower limit voltage value of the predetermined voltage range.

4. An electroluminescent display apparatus comprising:

a display panel including a plurality of pixels;

a gate driver configured to drive scan lines and emission lines connected to the plurality of pixels; and a data driver configured to drive data lines connected to the plurality of pixels, wherein a pixel circuit of each of the plurality of pixels comprises:

a driving transistor including a gate electrode connected to a gate node and a source electrode connected to a source node, and configured to generate a driving current;

a first light emitting device including a first anode electrode, and configured to emit light in response to the driving current;

a second light emitting device including a second anode electrode, and configured to emit light in response to the driving current;

a first emission transistor configured to connect the source node to the first anode electrode in an odd frame and disconnect the source node from the first anode electrode during an even frame, in response to a first emission signal supplied through a first emission line;

a second emission transistor configured to connect the source node to the second anode electrode in the even frame and disconnect the source node from the second anode electrode during the odd frame, in response to a second emission signal supplied through a second emission line;

a first scan transistor configured to supply a reset voltage to the first anode electrode, based on a first scan signal supplied through a first scan line; and a second scan transistor configured to supply the reset voltage to the second anode electrode, based on a second scan signal supplied through a second scan line, wherein the first light emitting device is turned on during an emission period of the odd frame and maintains an off state during the even frame, and the second light emitting device is turned on during an emission period of the even frame and maintains an off state during the odd frame, and wherein the first scan transistor is turned on in another period, except the emission period, of the odd frame and is turned on in all periods of the even frame, and the second scan transistor is turned on in another period, except the emission period, of the even frame and is turned on in all periods of the odd frame.

5. The electroluminescent display apparatus of claim 4, wherein the first emission transistor is turned on during the emission period of the odd frame and is turned off during all periods of the even frame, and wherein the second emission transistor is turned on during the emission period of the even frame and is turned off during all periods of the odd frame.

6. The electroluminescent display apparatus of claim 4, wherein, in a data writing period preceding the emission period of the odd frame or a data writing period preceding the emission period of the even frame, a data voltage included in a predetermined voltage range is applied to the gate node so as to implement a gray level, and wherein the reset voltage is less than a lower limit voltage value of the predetermined voltage range.

7. The electroluminescent display apparatus of claim 4, wherein the pixel circuit is configured to:

supply a reset voltage to the first and second anode electrodes in a period before the emission period of the odd frame during the odd frame, and supply the reset voltage to the first and second anode electrodes in a period before the emission period of the even frame during the even frame.

* * * * *